J. W. KELLY.
WATER CLOSET.
APPLICATION FILED JAN. 29, 1919.
1,298,350.
Patented Mar. 25, 1919.
2 SHEETS—SHEET 2.
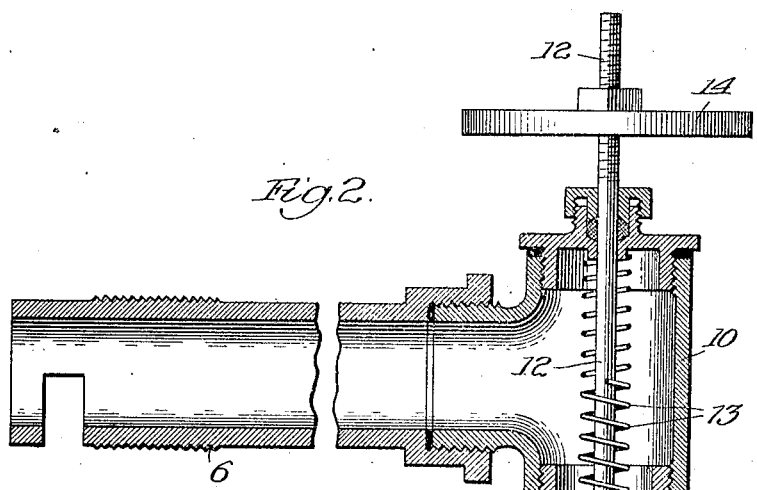
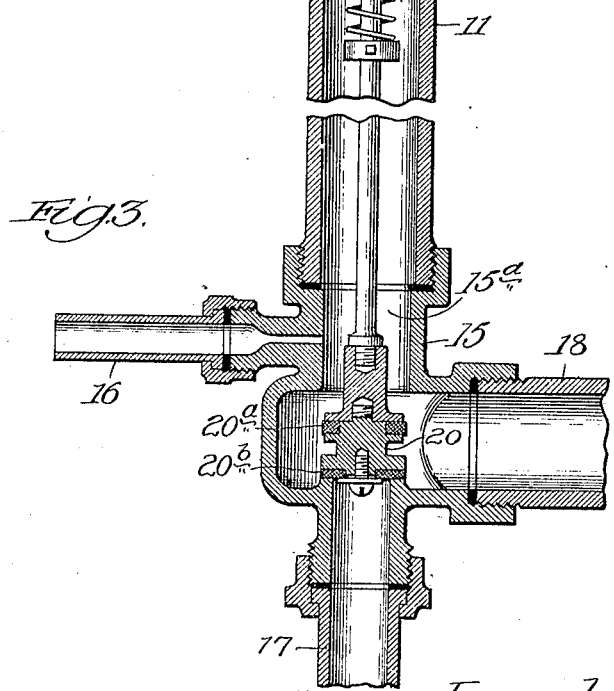

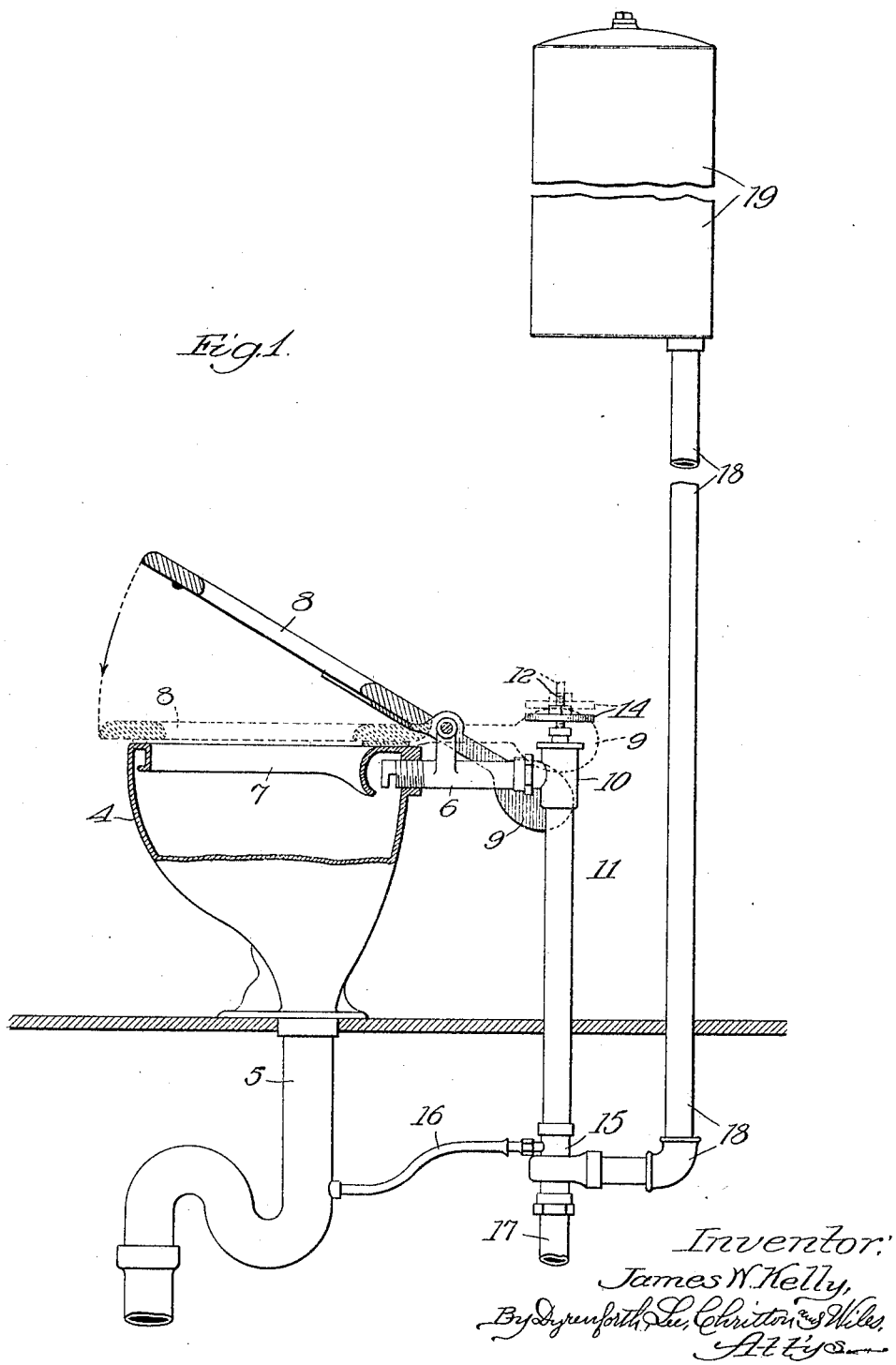

UNITED STATES PATENT OFFICE.

JAMES W. KELLY, OF CHICAGO, ILLINOIS.

WATER-CLOSET.

1,298,350.

Specification of Letters Patent.

Patented Mar. 25, 1919.

Application filed January 29, 1919. Serial No. 273,768.

*To all whom it may concern:*

Be it known that I, JAMES W. KELLY, a citizen of the United States, residing at Chicago, in the county of Cook and State of Illinois, have invented a new and useful Improvement in Water-Closets, of which the following is a specification.

My invention relates to an improvement in the class of water-closet equipments in which the bowl is automatically flushed with water from a pressure flush-tank, the valved supply to which and to the bowl is controlled by the closet-seat.

The primary object of my invention is to adapt one valve-device of special construction to normally shut off the water-supply to the tank and open the discharge from the tank to the bowl by raising the closet-seat and to open the supply to the tank and shut off communication between the latter and the bowl by depressing the seat.

In the accompanying drawing, Figure 1 is a view in elevation, partly broken and sectional, of a water-closet provided with my improvement; Fig. 2 is an enlarged broken sectional view showing the spring-pressed valve-stem and other details, and Fig. 3 is a similar view showing the valve-device.

The bowl 4 with its trapped soil-pipe 5 is of any desired form and construction, though where my improvement is employed for rendering frost-proof such water-closet equipments as are designed to be located in places unprotected against freezing temperature, for which purpose it is especially useful, the bowl should be of iron and suitably enameled, with the lead-pipe 6 for the flushing water screwing into the flush-rim 7. The seat 8, shown hinged to the pipe 6, carries behind the hinge a weight 9 tending to hold it in and restore it to the normally raised illustrated position. The outer end of the pipe 6 is coupled to a closed head 10 on the upper end of the so-called dry-pipe 11, through which and the head extends a valve-stem 12 tending to be pressed downwardly by the force of a spring 13 coiled about it, the stem carrying a disk 14 on its projecting end to extend in the path of the weight 9 and be encountered thereby, in depressing the seat, to raise the valve-stem against the resistance of the spring for the purpose hereinafter explained. A coupling 15 on the lower end of the pipe 11 connects therewith a drain-pipe 16 leading to the pipe 5, a water-supply pipe 17 leading upwardly into the coupling from any suitable source where the supply is under pressure, and a flush-pipe 18 leading laterally from the coupling and rising to an overhead flush-tank 19, which should be sealed or covered, both to cause the inflow of water to compress the air in it for increasing the discharging-force and to prevent overflow in filling the tank.

In the coupling 15 is housed my improved valve-device 20 on the lower end of the stem 12, and comprising a suitably packed upper piston-valve $20^a$ and a similarly packed seating-valve $20^b$. The valve $20^b$ seats downwardly, under the normally-exerted expansion-force of the spring 13, against a seat above the pipe 17 in the coupling 15, to shut off the water-supply to the tank. By raising the stem, the valve $20^b$ is withdrawn from its seat to open the supply of flush-water to the tank, and the valve $20^a$ is raised, to fit, piston-like, in a neck $15^a$ of the coupling, where it shuts off communication of the pipe 18 with the pipe 11 and also with the drain-pipe 16.

As will be understood from the foregoing description, when the seat is depressed, the stem is raised to lift the valve $20^b$ off its seat and the valve $20^a$ into the neck $15^a$, thereby, during the occupancy, permitting the tank to be filled and thereafter, by the rise of the seat, shutting off the supply to the tank and permitting its contents to discharge into the bowl through the flush-rim and any remnant of water in the pipe 11 to drain off through the pipe 16 and thus prevent freezing thereof in cold weather.

I realize that considerable variation is possible in the details of construction herein shown and described, and I do not intend by illustrating a single specific or preferred embodiment of my invention to be limited thereto, it being my intention in the following claims to claim protection for all the novelty there may be in my invention as fully as the state of the art will permit.

I claim:—

1. In a water-closet equipment having a bowl provided with a discharge-pipe, a flush-tank and a pipe leading therefrom, a water-supply pipe, and a dry-pipe leading to the bowl, a single valve-device at the junction of said three last named pipes, comprising a valve normally seating against the pressure in said supply-pipe and a piston-valve operating by unseating said valve, to shut off communication between the pipe leading from the tank and the dry-pipe.

2. In a water-closet equipment, in combination with the bowl and flush-tank, a water-supply pipe, a pipe leading from said tank and a dry-pipe leading to the bowl, a coupling connecting said pipes and containing a valve-seat above said supply-pipe and having a neck, a valve-stem in said dry-pipe and a valve-device on said stem in the coupling, comprising a valve normally bearing on said seat to shut off the water-supply to the tank and a piston-valve entering said neck by raising said valve to open communication between the water-supply pipe and tank and shut off communication between the pipe leading from the tank and the dry-pipe.

3. In a water-closet equipment, in combination with the bowl and flush-tank, a water-supply pipe, a pipe leading from said tank, a dry-pipe leading to the bowl, and a drain-pipe leading from the dry-pipe to the bowl discharge-pipe, a coupling connecting said pipes and containing a valve-seat above said supply-pipe and having a neck, a valve-stem in said dry-pipe and a valve-device on said stem in the coupling, comprising a valve normally bearing on said seat to shut off the water-supply to the tank and a piston-valve entering said neck by raising said valve to open communication between the water-supply pipe and tank and shut off communication between the pipe leading from the tank and the dry-pipe and drain-pipe.

4. In a water-closet equipment, in combination, a bowl provided with an automatically rising seat, a flush-tank, a water-supply pipe, a pipe leading from said tank and a dry-pipe leading to the bowl, a coupling connecting said pipes at their adjacent ends and containing a valve-seat above said supply-pipe and having a neck, a spring-depressed valve-stem in said dry-pipe, means on said bowl-seat for engaging said stem to raise it in opposition to its depressing spring by lowering the bowl-seat, and a valve-device on said stem, comprising a valve, normally bearing under the pressure of said spring on said valve-seat to shut off the water-supply to the tank, and a piston-valve entering said neck by raising said valve to open communication between the water-supply pipe and tank and shut off communication between the pipe leading from the tank and the dry-pipe.

5. In a water-closet equipment, in combination, a bowl provided with a seat carrying a seat-raising weight, a flush-tank, a water-supply pipe, a pipe leading from said tank, a dry-pipe leading to the bowl, and a drain-pipe connecting the dry-pipe with the discharge from the bowl, a coupling connecting said pipes at their adjacent ends and containing a valve-seat above said supply-pipe and having a neck, a spring-depressed valve-stem in said dry-pipe having a disk on its projecting upper end in the path of movement of said weight, and a valve-device on the lower end of said stem, comprising a valve normally held against said valve-seat to shut off the water-supply to the tank, and a piston-valve entering said neck by raising said valve to open communication between the pipe leading from the tank and the dry-pipe and drain-pipe.

JAMES W. KELLY.

Copies of this patent may be obtained for five cents each, by addressing the "Commissioner of Patents, Washington, D. C."